Jan. 4, 1955   W. G. WEATHERLY   2,698,606
COOPERATING LEVER AND VACUUM MEANS FOR ACTUATING CLUTCHES
Filed Dec. 17, 1951
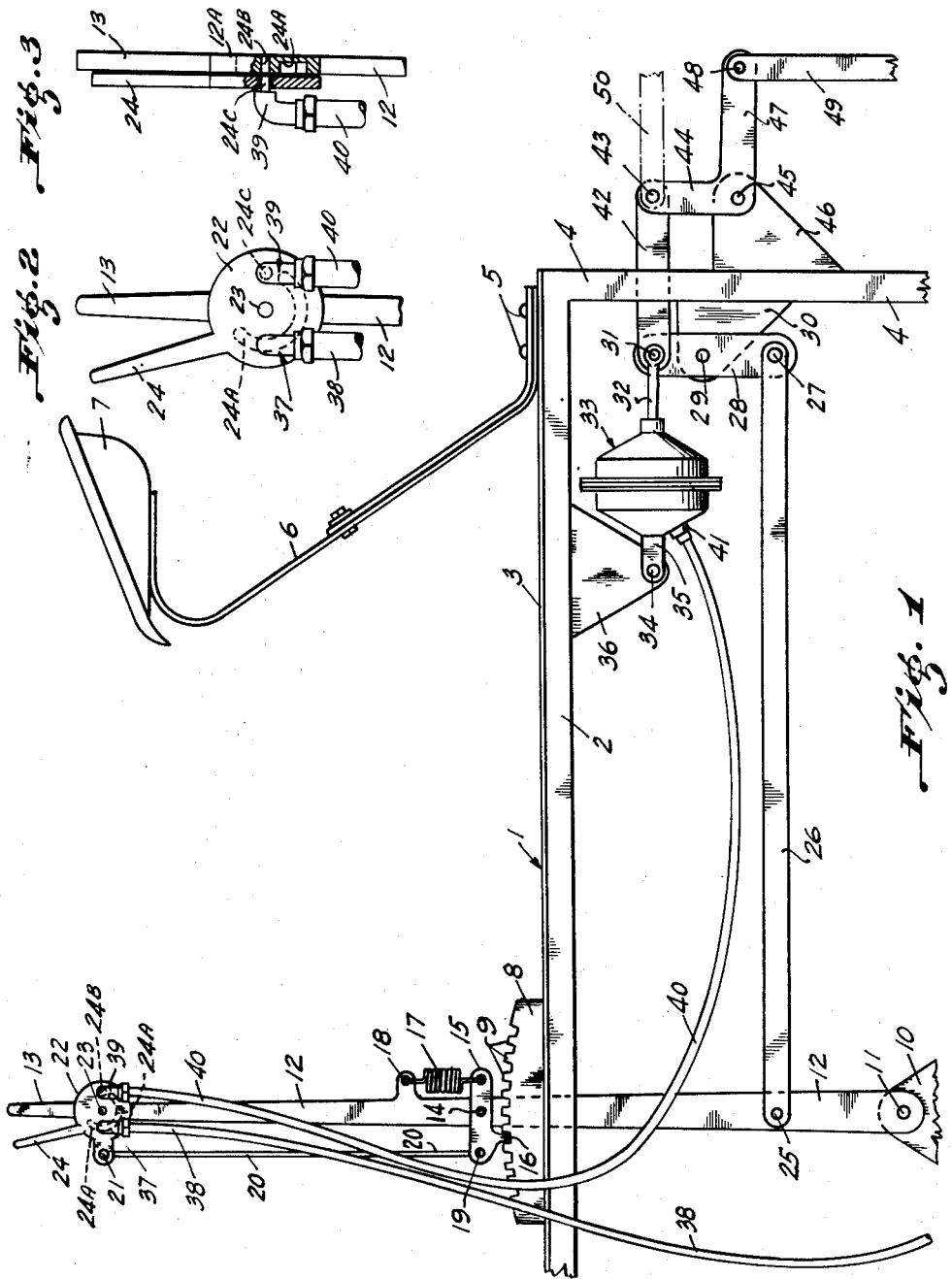
INVENTOR.
WILLIAM G. WEATHERLY
BY
James Givnan
ATT'Y

United States Patent Office 2,698,606
Patented Jan. 4, 1955

2,698,606

COOPERATING LEVER AND VACUUM MEANS FOR ACTUATING CLUTCHES

William G. Weatherly, Clarkston, Wash.

Application December 17, 1951, Serial No. 261,972

1 Claim. (Cl. 121—40)

This invention relates to improvements in reaper-thresher machines and more particularly to the construction of means for manipulating the multi-clutch mechanisms and other related parts employed in such machines.

Heretofore the clutching mechanisms of these machines have been operated by hand and/or foot operated lever mechanisms which required a great amount of effort on the part of the operator, and as a result would retard the operation of the machine in its entirety.

Accordingly, it is one of the principal objects of my invention to provide a vacuum controlled means cooperating with hand operated means to accomplish the work of actuating the clutch mechanisms with no effort on the part of the operator other than merely moving the hand lever from an inoperative position to an operative position on the chassis of the vehicle.

Another object of the invention is the provision of a device of this character which is of simple, efficient, durable, and inexpensive construction and which may be readily installed in or adapted to farm machinery of various types.

These and other objects will appear as my invention is more fully hereinafter described in the following specification, illustrated in the accompanying drawing and finally pointed out in the appended claim.

In the drawing:

Figure 1 represents a fragmentary side elevation of a seat supporting platform and controls made in accordance with my invention mounted upon the platform and within convenient reach of an operator.

Figure 2 is an enlarged fragmentary front view of the upper end of an operating lever and a valve mechanism associated therewith.

Figure 3 is a side view of Figure 2 with a fragment broken away for convenience of illustration.

Referring now more particularly to the drawing:

Reference numeral 1 indicates generally an operator's platform made up of horizontal members 2 covered by a flooring 3 and vertical supports 4 secured to the chassis of the vehicle in any approved manner. Mounted to the floor 3 of the platform by any approved means such as rivets or the like as indicated at 5 is a spring member 6 to whose upper end is secured by welding or the like an operator's seat 7. To the opposite or forward end of the platform I secure a quadrant 8 formed with gear teeth 9 along a portion of its periphery. To the chassis of the vehicle I secure a pair of aligned brackets 10 through which is journaled a shaft 11 to whose one end is secured the bottom end of an actuating lever 12 whose upper or opposite end is formed into a hand grip 13. Pivotally attached as at 14 to the lever 12 is a pawl 15 whose one end is provided with a tooth 16 adapted for engagement with the teeth 9 of the quadrant and whose opposite end is connected with one end of a tension spring 17 whose opposite end is connected as at 18 to the lever 12. This spring normally maintains the tooth 16 of the pawl 15 in engagement with the teeth 9 of the quadrant. The end of the pawl on which the tooth 16 is formed is connected as at 19 to one end of a rod 20 whose opposite or upper end is connected as at 21 to one side of a circular plate which is pivoted as at 23 to the lever 12 where the lever is enlarged as at 12A. The plate is formed with a handle 24 whereby movement of this handle from the position shown toward the hand grip 13 and through the medium of the rod 20 will disengage the tooth 16 of the pawl from the teeth 9 of the quadrant 8 to thereby allow the handle to be swung about its pivotal connection 11 on the chassis. The circular enlargement 12A is formed with an arcuate groove 24A and an air vent port 24B. The lever 12 is pivotally connected as at 25 to one end of a link 26 whose opposite end is pivotally connected as at 27 to one end of a rocker arm 28 swingably attached by means of a shaft 29 and bracket 30 to the vertical support 4 of the frame. The opposite or upper end of the rocker arm 28 is pivotally connected as at 31 to one end of an arm 32 whose opposite or inner end is connected to and adapted to be actuated by a conventional vacuum chamber generally indicated at 33. The chamber is pivotally attached as at 34 by means of an arm 35 to a plate or bracket 36 secured to and depending from one of the longitudinal members 2 of the frame 1.

Attached to a fitting 37 which extends through the plate 22 and into open communication with the groove 24 at all times is one end of a flexible hose 38 whose opposite end is in open communication with the intake manifold of an engine (not shown). A companion fitting 39 also extends through the plate 22 as at 24C and is attached to one end of a flexible hose 40 whose opposite end is connected as at 41 to the vacuum chamber 33.

With the valve-actuating lever 24 in the position shown the vacuum from the intake manifold of the engine to the vacuum chamber is cut off because the fitting 39 is out of communication with the groove 24A and the vacuum chamber is thereby rendered inoperative. In said position of the actuating lever it will be seen that the fitting 39 is in open communication with the air vent port 24B to thereby vent chamber of means 33 to the atmospheric air. When the lever 24 is moved toward the hand grip 13 of the lever 12 by the normal grip of an operator moving the lever 12 toward him, or to the right as viewed in the drawing, the fitting 39 will thereby be moved by the rotation of the plate 22 into communication with the groove 24A with which the fitting 37 is always in open communication as aforesaid and the vacuum from the engine manifold will be directed through the hose 40 to the vacuum chamber to put it into operation. At the same time, through the medium of the rod 20, the tooth 16 of the pawl 15 will be disengaged from the teeth of the quadrant 8 to permit the lever 12 to be swung rearwardly or toward the operator as aforesaid. Accordingly the rocker arm 28 is then operated by the vacuum chamber with a minimum effort on the part of the operator in merely drawing the lever 12 toward him as aforesaid instead of exerting a great deal of effort in drawing the conventional lever toward him and at the same time depressing a foot lever which may now be eliminated as a result of my invention.

By means of the link 26, the actuating lever 12 and the vacuum chamber 33 work together in moving the rocker arm 28 about its pivotal connection 29. Pivotally connected at one of its ends, as at 31 to the shaft 32 of the vacuum chamber and also to the upper end of the rocker arm 28, is a link 42, whose opposite end is pivotally connected as at 43 to one leg 44 of a bell-crank pivotally attached as at 45 to a bracket 46, carried by one of the vertical supports for the frame. The other leg 47 of the bell-crank is connected as at 48 to one end of a link 49 whose opposite end may be connected to clutching mechanisms and related parts and/or to other mechanisms employed in the machine or apparatus to which the invention is applied, and which heretofore had to be manipulated by hand and foot levers only. In some installations I may attache an additional operating link 50 to either leg of the bell-crank as I have shown in broken lines.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

Operating controls for a vehicle driven by an engine having an intake manifold, said controls comprising in combination a vacuum chamber pivotally attached to the chassis of the vehicle, an actuating lever pivotally attached at one of its ends to said chassis and extending upwardly therefrom, a gear quadrant secured to the chassis above the point of said pivotal attachment of the lever to the chassis, a spring-urged pawl carried by said lever and adapted to lock the lever in various adjusted positions by engagement with said gear quadrant, an enlargement formed on said lever near its upper end, an arcuate duct formed in said enlargement, a plate rotatably attached to said enlargement and covering said duct, a fitting extending through said plate and adapted for selective open communication with said duct, a hose connected to said fitting at one of its ends and adapted for attachment at its opposite end to the intake manifold of an engine, a companion fitting extending through said plate and at all times in open communication with said duct, a hose connected at one of its ends to said companion fitting and at its opposite end to said vacuum chamber, said plate having a handle for rotating the plate simultaneously with gripping the upper end of said lever, said plate being connected to said pawl for disengaging the same from said gear quadrant and simultaneously placing said first mentioned fitting into open communication with said duct whereby vacuum from the intake manifold of the engine will be directed through said duct and into said hose connecting said companion fitting to said vacuum chamber.

References Cited in the file of this patent

UNITED STATES PATENTS

| | | |
|---|---|---|
| 1,214,965 | Snyder | Feb. 6, 1917 |
| 1,260,780 | Latshaw | Mar. 26, 1918 |
| 1,705,626 | Rosenberg | Mar. 19, 1929 |
| 2,037,867 | Wall | Apr. 21, 1936 |